United States Patent Office 3,006,862
Patented Oct. 31, 1961

3,006,862
METHOD OF REPLENISHING LOST COPPER FROM A COPPER CATALYST SOLUTION
Charles G. Hard, Houston, Tex., assignor to Hard-Lowe Company, South Houston, Tex., a corporation of Texas
No Drawing. Filed June 18, 1959, Ser. No. 821,092
6 Claims. (Cl. 252—415)

This invention relates to the recovery of copper values from copper-containing slag resulting from the regeneration of copper salt catalyst.

Copper salt catalysts are utilized in many catalytic processes. For instance, the production of acrylonitrile by the reaction of acetylene with hydrogen cyanide, the production of acetaldehyde by the reaction of acetylene with water, the production of vinyl chloride by the reaction of acetylene with hydrogen chloride, the production of cyanobutadiene by the reaction of monovinyl-acetylene with hydrogen cyanide, the production of chloroprene by the reaction of monovinylacetylene with hydrogen chloride. Other numerous similar synthesis reactions are well known in the literature.

The copper salt catalyst used in synthesis reactions such as described above is usually a solution of copper chloride and a solubilizing agent which is an alkali metal chloride or an alkali earth metal chloride. For example, potassium chloride and/or sodium chloride.

After the catalytic solution is spent, it may be regenerated by heating the solution in an oxidizing atmosphere to a temperature at which the undersirable volatile matter in the solution is driven off and the non-volatile undesirable matter is converted into a copper-containing slag. While only a relatively small amount of copper-containing slag is formed, it is desirable to recover the copper value. For a more detailed description of the regeneration process see my co-pending application Serial No. 821,233, filed June 18, 1959, for Method of Regenerating Copper Catalyst.

It is an object of this invention to provide an economic method of recovering copper values in a copper-containing slag.

Another object is to provide an economic method of recovering copper values in a copper-containing slag in which the recovered values are in a condition for use as a catalyst.

In the regeneration of copper catalyst solutions small amounts of copper are lost. This copper must be replenished. A balance must be maintained between the amount of copper in the catalyst and the amount of chlorine in the catalyst. This necessitates the addition of copper chlorides and/or solubilizing agents for the copper chlorides to maintain the proper balance in the regenerated catalytic solution.

It is an object of this invention to provide a method of replenishing lost copper from a copper catalyst solution, restoring the balance of copper to chlorine in a copper catalyst solution, and simultaneously recovering copper from copper-containing slag formed during previous regeneration of copper catalyst.

After the regeneration of a copper chloride catalyst by heating the solution to a temperature at which undesirable volatile gases are driven off, the regenerated catalyst is drawn off leaving in the furnace a copper-containing slag.

The melt is preferably tapped into a container of water to form a slurry having approximately the water content desired for the catalyst when used in the catalyzed process. This slurry is stowed in a large vessel with other melts of regenerated catalysts awaiting use. After each melt the small amount of slag in the furnace is collected and stowed.

From time to time analysis of the stowed regenerated catalyst will indicate that the copper content has been slightly reduced and/or that the balance between copper and chlorine of the catalyst, which is desirably approximately one to one, has deviated from the desired ratio.

At this time a melt of catalyst is placed in a furnace and heated to a dull red heat, which is about 600 to 700 degrees centigrade.

The copper-containing slag on hand is then thrown into the melt and chlorine gas is passed through the melt while the temperature is maintained until most of the slag is gone.

It has been found that a better recovery of copper from the slag will result if a small amount of copper particles is added to the melt with the slag.

The chlorine gas passing through the melt will combine with the copper in the slag to form copper chloride.

The melt may be tapped off from the furnace and added directly to a water bath to form a slurry which is of the proper composition to be used as a catalyst, and this slurry may be introduced into the storage vessel of other previously regenerated melts.

For economy of operation, slag from the regeneration process is usually retained until the copper content or the balance of the copper to chlorine in the main storage vessel is in need of change. At this time the copper recovery process is carried out so that during this process sufficient copper can be added to replenish copper lost during the regeneration step and sufficient solubilizing alkali metal chlorides or alkali earth chlorides, such as sodium and/or potassium chloride, may be added to restore the desired balance of copper to chlorine in the main storage tank. Of course, where the balance of the main storage tank is not considered, then only the balance of the melt in which the copper is recovered from slag need be considered. Frequently, the balance in the main tank will be acceptable but the copper lost will need to be replenished, and during the recovery process free copper in an amount to replenish lost copper will be added and sufficient solubilizing agent will be added to balance the newly added copper.

For example, with the addition of 7000 pounds of copper, 2100 pounds of potassium chloride and 700 pounds of sodium chloride might be added as solubilizing agents for the copper chloride to be formed from the copper and chlorine gas to be passed through the melt.

After the melt is tapped off, it will be found that a substantially copper-free slag will remain in the furnace, and this may be discarded as waste material.

During the operation of the furnace, it is desirable to provide a portion of the heat by an open flame immediately above the surface of the melt to burn any poisonous gases which may escape from the melt.

The starting material for the recovery melt is preferably regenerated catalyst. However, it may be unregenerated catalyst, and the starting material may be heated in an oxidizing atmosphere until all of the undesirable gases are driven off. Thereafter, the stowed slag may be added for recovery purposes.

In addition to copper the slag will contain solubilizing salts for the copper which are alkali metal chlorides or alkali earth metal chlorides. For example, potassium and sodium chlorides may be present. Their value is such that, while they are recovered in this process, the process is economical only because of the copper recovery.

*Example*

Slag having a varying copper content of about 12% to 50% has been charged into a furnace having a copper chloride-sodium chloride-potassium chloride melt heated to about 600 to 700 degrees C. Chlorine gas was then bubbled through the melt. After the slag had been reduced in volume about 80%, the melt was tapped off. The remaining slag was found to have a varying copper content of about 3% to 12%. The balance in the reduction of volume of the slag was due to recovery of solubilizing salts.

The foregoing disclosure and description of the invention is illustrative and explanatory thereof, and various changes in the process may be made within the scope of the appended claims without deaprting from the spirit of the invention.

What I claim is:

1. The method of replenishing lost copper from a copper catalyst solution of copper chlorides and solubilizing agents therefor selected from the group consisting of alkali metal chlorides and alkali earth metal chlorides comprising, heating said solution to about 600 to 700° C., introducing copper slag obtained from previous regenerations of copper catalyst solutions, and passing chlorine gas through the melt until most of the copper in the slag is dissolved in the melt.

2. The method of replenishing lost copper from a copper catalyst solution of copper chlorides and solubilizing agents therefor selected from the group consisting of alkali metal chlorides and alkali earth metal chlorides comprising, heating said solution to about 600 to 700° C., introducing copper slag obtained from previous regenerations of copper catalyst solutions, adding copper particles to the melt, and passing chlorine gas through the melt until most of the copper in the slag is dissolved in the melt.

3. The method of replenishing lost copper from a copper catalyst solution of copper chlorides and solubilizing agents therefor selected from the group consisting of alkali metal chlorides and alkali earth metal chlorides comprising, heating said solution to about 600 to 700° C., introducing copper slag obtained from previous regenerations of copper catalyst solutions, adding copper particles and solubilizing agents selected from the group consisting of alkali metal chlorides and alkali earth metal chlorides in an amount to provide approximately a weight ratio of total copper to total chlorine of at least nine-tenths to one, but less than one and one-half to one, and passing chlorine gas through the melt until copper in the slag is dissolved in the melt.

4. The method of replenishing lost copper from a copper catalyst solution of copper chlorides, potassium chloride and sodium chloride comprising, heating said catalyst to about 600 to 700° C., introducing copper containing slag into the mixture, and passing chlorine gas through the melt until the copper in the slag is dissolved in the melt.

5. The method of replenishing lost copper from a copper catalyst solution of copper chlorides, potassium chloride and sodium chloride comprising, heating said catalyst to about 600 to 700° C., introducing copper containing slag into the mixture, adding copper particles to the melt, and passing chlorine gas through the melt until the copper in the slag is dissolved in the melt.

6. The method of replenishing lost copper from a copper catalyst solution of copper chlorides, potassium chloride and sodium chloride comprising, heating said catalyst to about 600 to 700° C., introducing copper containing slag into the mixture, adding copper particles, potassium chloride and sodium chloride to the melt in an amount to provide approximately a weight ratio of total copper to total chlorine of at least nine-tenths to one, but less than one and one-half to one, and passing chlorine gas through the melt until most of the copper in the slag is dissolved in the melt.

References Cited in the file of this patent

UNITED STATES PATENTS

| 1,414,491 | Welch | May 2, 1922 |
| 1,915,152 | Calcott et al. | June 20, 1933 |